United States Patent [19]
Yamane et al.

[11] Patent Number: 5,884,200
[45] Date of Patent: Mar. 16, 1999

[54] RADIO COMMUNICATION APPARATUS HAVING A PLURALITY OF IDENTIFICATION CODES

[75] Inventors: Kazuyasu Yamane, Hamura; Takeya Oikawa, Ome; Tomohiro Niimi, Fussa, all of Japan

[73] Assignee: Casio Computer Co., Ltd., Tokyo, Japan

[21] Appl. No.: 827,399

[22] Filed: Mar. 27, 1997

Related U.S. Application Data

[63] Continuation of Ser. No. 458,788, Jun. 2, 1995, abandoned.

[30] Foreign Application Priority Data

Jun. 30, 1994 [JP] Japan .................................. 6-149055

[51] Int. Cl.⁶ ...................................................... H04B 1/38
[52] U.S. Cl. ......................... 455/575; 455/567; 455/566; 455/552; 455/426
[58] Field of Search ..................................... 455/403, 412, 455/422, 426, 462, 465, 517, 550, 551, 552, 554, 555, 556, 557, 558, 567, 575, 186.1, 90, 347, 348, 349, 351, 414, 73; 379/357, 354, 201

[56] References Cited

U.S. PATENT DOCUMENTS

| 4,534,061 | 8/1985 | Ulug ........................................ 455/54.1 |
| 4,593,155 | 6/1986 | Hawkins . | |
| 4,677,653 | 6/1987 | Weiner et al. ............................ 379/58 |
| 4,975,694 | 12/1990 | McLaughlin et al. ............. 340/825.44 |
| 5,101,500 | 3/1992 | Marui ..................................... 455/33.1 |
| 5,134,717 | 7/1992 | Rasmussen ........................... 455/186.1 |
| 5,192,947 | 3/1993 | Neustein ............................. 340/825.44 |
| 5,404,580 | 4/1995 | Simpson et al. ......................... 455/89 |
| 5,428,666 | 6/1995 | Fyfe et al. ............................. 455/54.1 |
| 5,437,053 | 7/1995 | Sawa et al. ............................ 455/33.1 |
| 5,448,622 | 9/1995 | Huttunen ............................... 455/567 |
| 5,448,765 | 9/1995 | Kovanen et al. .................... 455/186.1 |
| 5,490,284 | 2/1996 | Itoh et al. .............................. 455/33.1 |

FOREIGN PATENT DOCUMENTS

| 0369110 | 5/1990 | European Pat. Off. ................. 455/89 |
| 2241133 | 8/1991 | United Kingdom . |
| 2269512 | 2/1994 | United Kingdom . |
| WO 91/12698 | 8/1991 | WIPO . |
| WO/92/19078 | 10/1992 | WIPO . |
| WO/94/08433 | 4/1994 | WIPO . |

OTHER PUBLICATIONS

English Translation for EP 369,110 A2, May 1990.

Primary Examiner—Doris H. To
Attorney, Agent, or Firm—Frishauf, Holtz, Goodman, Langer & Chick

[57] ABSTRACT

In a radio communication apparatus having a plurality of identification codes, one of the plurality of identification codes is selected in a calling process. In this case, a particular one of the plurality of identification codes can be selected from (i) a plurality of identification codes stored in a memory of the radio communication apparatus, (ii) a plurality of identification codes stored in a memory of the radio communication apparatus and a memory attached detachably to the radio communication apparatus, and (iii) a plurality of identification codes stored in a plurality of memories attached detachably to the radio communication apparatus.

12 Claims, 15 Drawing Sheets

RADIO COMMUNICATION APPARATUS HAVING A PLURALITY OF IDENTIFICATION CODES

This application is a Continuation of application Ser. No. 08/458,788, filed Jun. 2, 1995 now abandoned.

BACKGROUND OF THE INVENTION

1. Field of the Invention

The present invention relates to a radio communication apparatus and, more particularly, to a radio communication apparatus having a plurality of identification codes.

2. Description of the Related Art

Telephone sets, data terminals, and the like are currently available as radio communication apparatuses. These radio communication apparatuses respectively have unique identification codes for connection to communication networks via private base stations and public base stations. In general, such an identification code is stored in a memory in a radio communication apparatus, and authentication with respect to each base station or a communication network side (communication network management station) is performed to permit speech communication. Also, attempts have been made to store this identification code in a detachable memory and mount the memory in a radio communication apparatus so as to make the apparat us serve as a terminal having the identification code stored in the memory.

One identification code, however, is given to each of such radio communication apparatuses. That is, when one user is to use a plurality of identification codes, the user must purchase terminals for the respective identification codes. When, for example, one user is to use different identification codes in the office and the home, the user must purchase terminals for the office and the home or detachable memories for the office and the home.

SUMMARY OF THE INVENTION

The present invention has been made to solve the above problem, and it is an object of the present invention to provide a radio communication system capable of changing a plurality of identification codes in accordance with the life-style of a user.

According to an aspect of the present invention, there is provided a radio communication apparatus for performing communication via base stations connected to communication networks, comprising: means for storing a plurality of identification codes; means for designating one of the plurality of identification codes stored in said storing means; and means for performing calling process on the basis of the identification code designated by said designating means.

According to another aspect of the present invention, there is provided a radio communication apparatus for performing communication via base stations connected to communication networks, comprising: means for receiving incoming calls based on a plurality of identification codes from said base station; and means for notifying an identification code corresponding to an incoming call received by said receiving means.

In the present invention, one radio communication apparatus has a plurality of identification codes. Of the plurality of identification codes, an identification code is selected in a calling operation to perform calling process. Alternatively, call-incoming process is performed on the basis of an identification code in a call-incoming operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

An embodiment of the present invention will be described hereinafter with reference to the accompanying drawings.

In the following embodiment, the present invention is applied to a PHS (Personal Handy Phone System) planned to be put into practice in Japan. However, the present invention is not limited to this.

A. System Configuration

Figure 1:
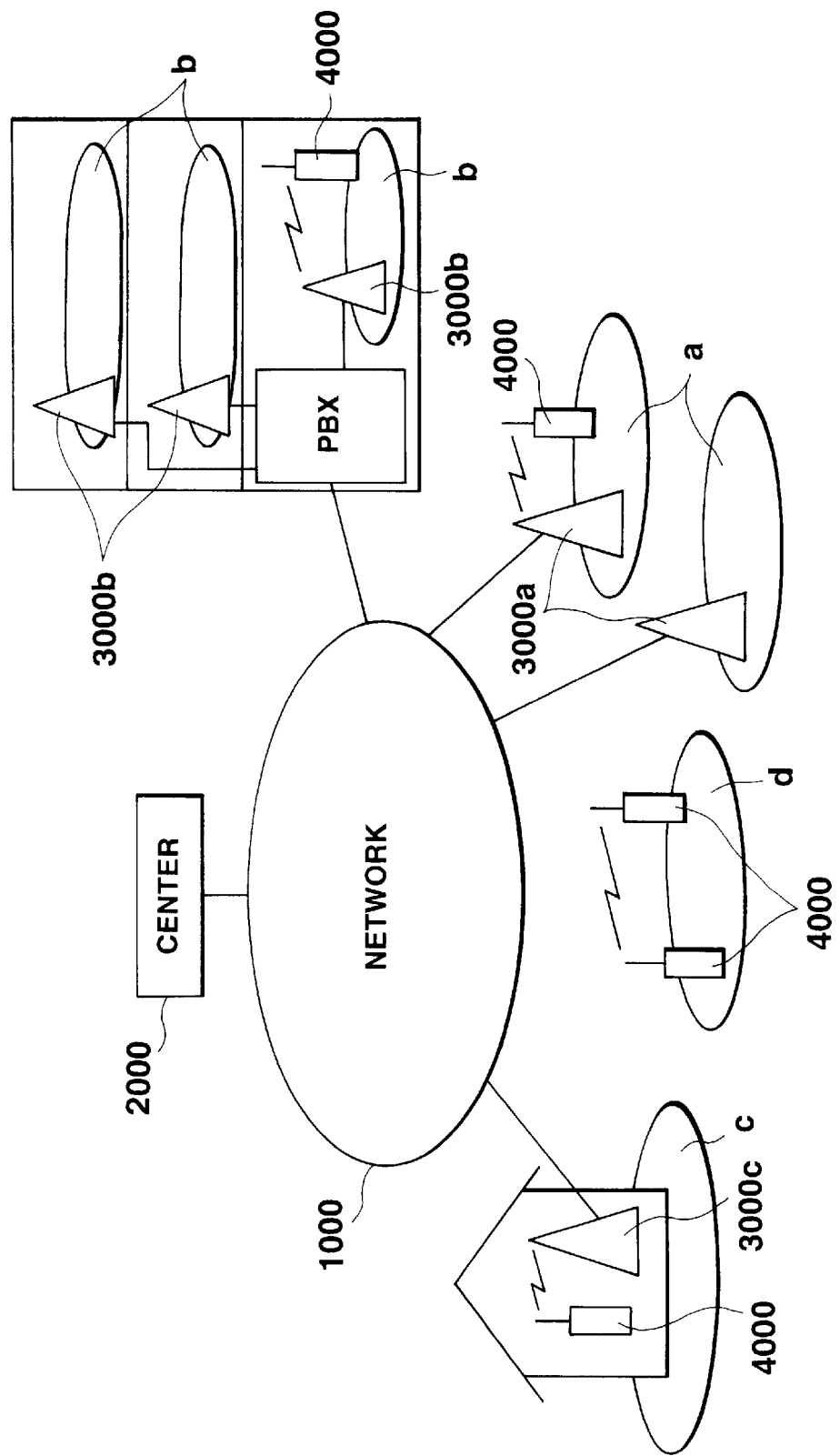
FIG. 1 is a view for explaining the configuration of a communication system to which the present invention is applied.

FIG. 1 is a view for explaining the system configuration of a PHS. Referring to FIG. 1, a network 1000 is an existing communication network, which is constituted by, e.g., a PSTN (Public Switched Telephone Network), an ISDN (Integrated Services Digital Network), a portable telephone network, and the like. A center 2000 performs overall system management, e.g., exchange control of these communication networks, exchange control between communication networks, and exchange control of a PHS.

Base stations 3000a to 3000c are connected to the network 1000. The base station 3000a is a base station installed outdoors. The base station 3000a can be connected by radio to a PHS terminal 4000 in a communication area a. The base station 3000b is a base station installed in an office and connected to the network 1000 via a PBX (Private Branch Exchange). The base station 3000b can be connected by radio to the PHS terminal 4000 in a communication area b. The base station 3000c is a base station installed in a home. The base station 3000c can be connected to the PHS terminal 4000 in a communication area c. The PHS terminal 4000 can be used in all the communication areas a, b, and c.

Assume that two PHS terminals 4000 are located close, and the communication areas of the terminals overlap as indicated by a communication area d. In this case, the two terminals can perform direct communication (to be referred to as inter-terminal direct communication hereinafter) without the mediacy of any base station. Note, however, that this inter-terminal direct communication can be performed only when the two terminals belong to the same base station (in the home or the office).

Note that different identification codes are used for the PHS terminal 4000 in the home, the office, and the public. In addition, an identification code used in inter-terminal direct communication is based on a base station to which the PHS terminal 4000 belongs.

B. PHS Terminal Configuration

The above PHS terminals 4000 can be classified into three types of terminals depending on the forms of storage of identification codes.

Type A: A plurality of identification codes are stored in the internal memory of the PHS terminal body.

Type B: Some of a plurality of identification codes are stored in the internal memory of the PHS terminal body, and the remaining identification codes are stored in a detachable memory.

Type C: A plurality of detachable memories in which identification codes are stored can be mounted in the PHS terminal body.

Type A

Figure 2:
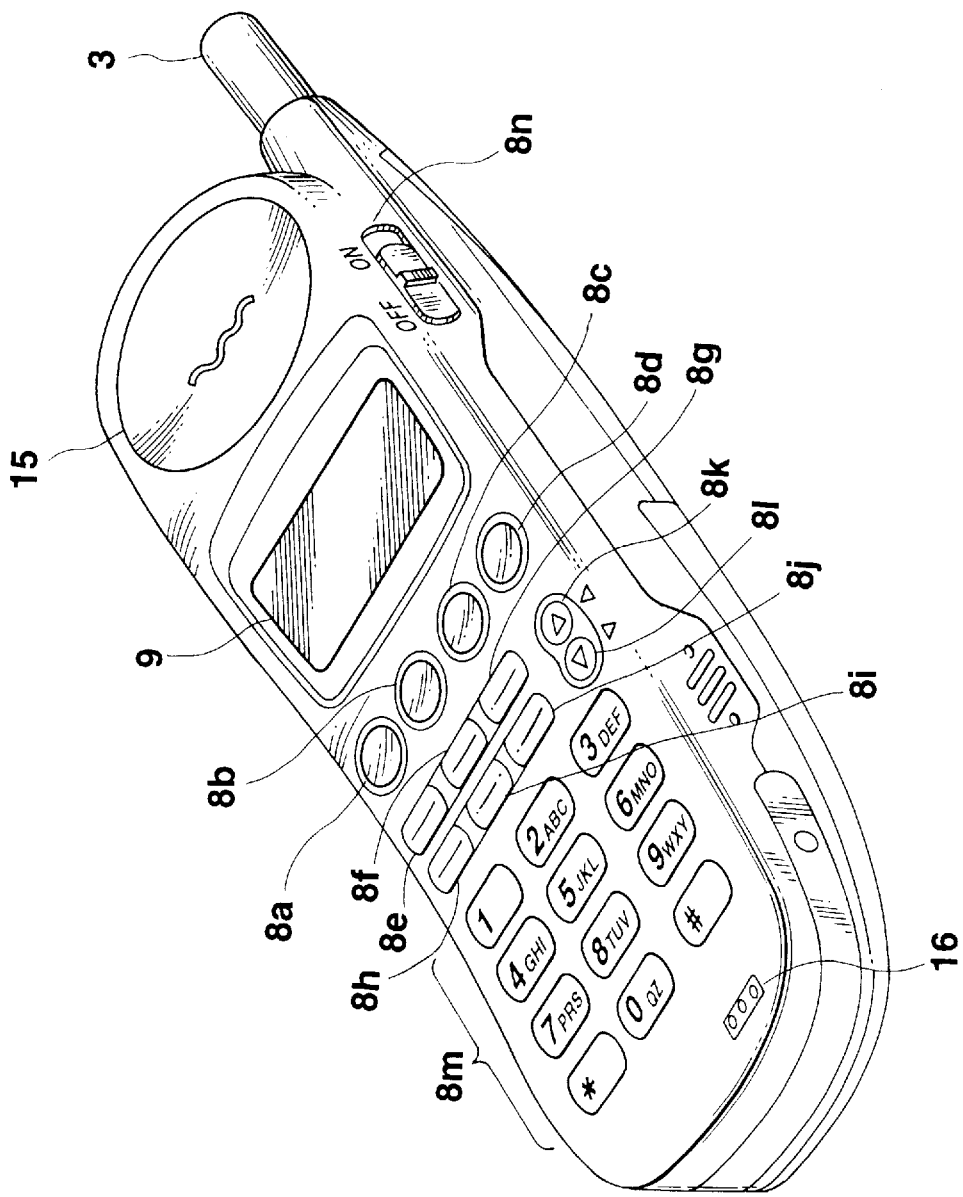
FIG. 2 is a perspective view showing type A of the present invention.
Figure 3:
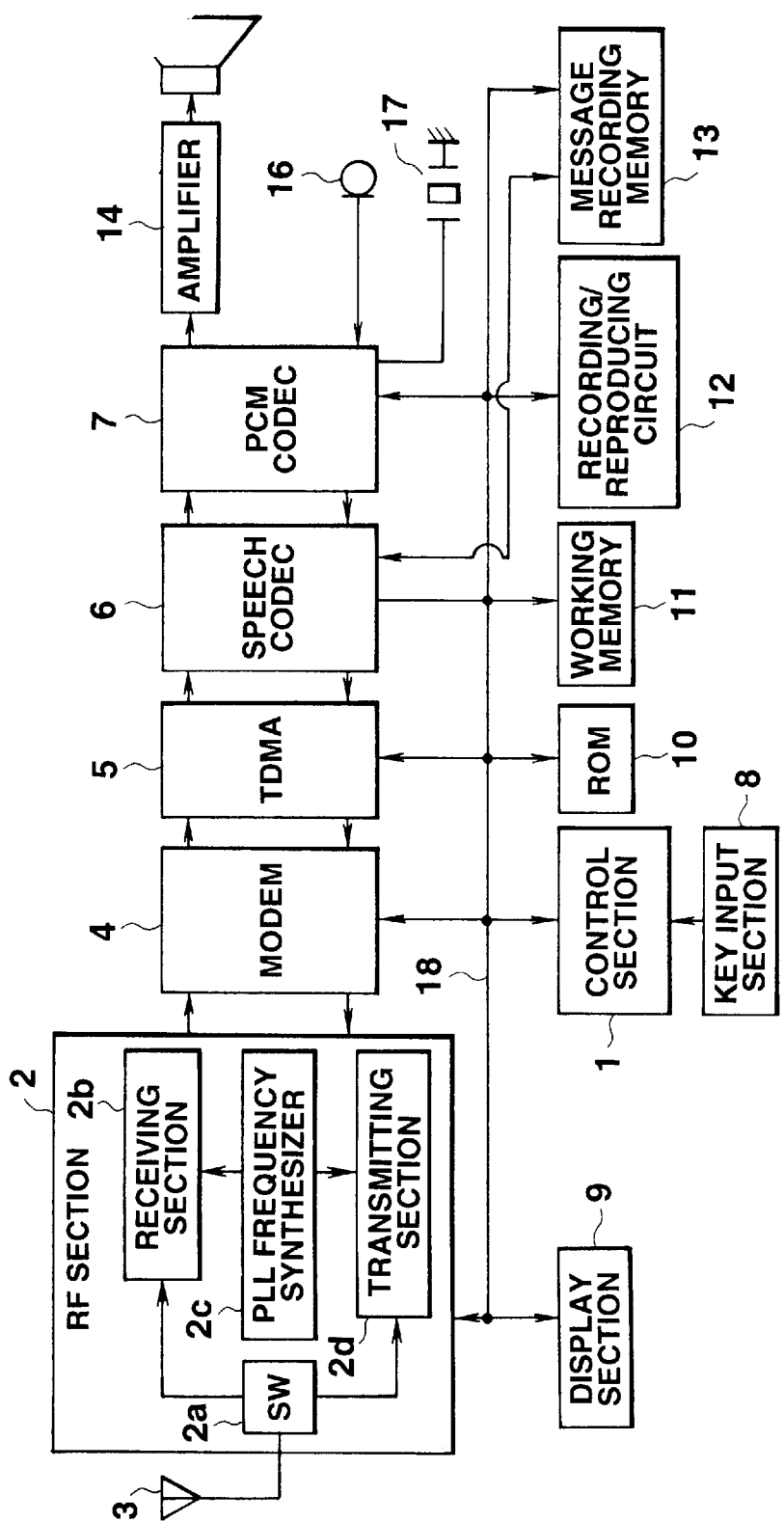
FIG. 3 is a block diagram showing type A of the present invention.

FIG. 2 is a perspective view showing a PHS terminal of type A. FIG. 3 is a block diagram showing the PHS terminal in FIG. 2.

Referring to FIG. 3, reference numeral 1 denotes a control section to which a high frequency section 2, a modem 4, a TDMA (Time Division Multiple Access) processing section 5, a speech CODEC 6, a PCM CODEC 7, a display section 9, a ROM 10, a working memory 11, a recording/reproducing circuit 12, and a message recording memory 13 are connected to via a bus 18.

The control section 1 controls the overall operation of the terminal in accordance with control programs stored in the ROM 10. More specifically, the control section 1 executes setting/collation processing of an identification code and setting/control processing of an automatic answering telephone function as a well as a general communication process such as calling/call-incoming process.

In a setting process of an identification code, the control section 1 sets one of a plurality of identification codes which is to be used in a calling operation. With this identification code setting process, one of the plurality of identification codes stored in a predetermined area of the ROM 10 is read out and set in the TDMA processing section 5 (to be described later). In identification code collation process, the control section 1 collates a received identification code with the plurality of identification codes stored in the ROM 10 in a call-incoming operation to identify the received identification code.

In a setting process of the automatic answering telephone function, the control section 1 sets whether to use the automatic answering telephone function in a call-incoming operation. The control section 1 performs this process for each identification code. In a control process of the automatic answering telephone function, the control section 1 executes the automatic answering telephone function if the automatic answering telephone function is set on the basis of the identification code collated by the identification code collation process.

A key input section 8 is connected to the control section 1. As shown in FIG. 2, the key input section 8 has an identification code setting key 8d for manually setting an identification code in a calling operation and a ten-key pad 8m for inputting a destination subscriber number and the like. In addition, the key input section 8 has a calling key 8a for designating a call of a destination subscriber number or the like, an end key 8b for disconnecting a channel, a transceiver key 8c for designating inter-terminal direct communicating or extension communication, a telephone directory key 8e for designating a mode for searching a telephone directory database, an automatic answering telephone function key 8f for setting the automatic answering telephone function, a redial key 8g for redialing a previously dialed number with one touch, a registration key 8h for designating registration of data in each mode, a delete key 8i for designating deletion of data in each mode, a selection key 8j to be selected when a service provided by a communication service company is to be designated, and a power supply key 8n for turning on/off the power supply of the terminal.

The high frequency section 2 performs a frequency conversion process, and has an antenna switch 2a, a receiving section 2b, a PLL frequency synthesizer 2c, and a transmitting section 2d. The antenna switch 2a is connected to an antenna 3. The antenna switch 2a selects the receiving section 2b or the transmitting section 2d to distribute a signal to the receiving section 2b or the transmitting section 2d at a transmission/reception timing.

The receiving section 2b frequency-converts a signal input from the antenna 3 via the antenna switch 2a into a reception IF signal by using two mixers (not shown). The transmitting section 2d frequency-converts a modulated wave of a $\pi/4$ shift QPSK (Quadrature Phase Shift Keying) scheme, input from the modem 4, by using a mixer (not shown), and radiates the resultant signal from the antenna 3 via the antenna switch 2a. The PLL frequency synthesizer 2c outputs a local oscillation signal for frequency conversion in the receiving section 2b and the transmitting section 2d.

The receiving section 2b or the transmitting section 2d of the high frequency section 2 is connected to the modem 4. The modem 4 performs modulation/demodulation processing of the π/4 shift QPSK scheme. In the reception mode, the modem 4 demodulates a reception IF signal from the receiving section 2b of the high frequency section 2. With this operation, the reception IF signal is separated into in-phase component data and a quadrature component data to be transferred, as a data string, to the TDMA processing section 5. In the transmission mode, the modem 4 forms in-phase component data and quadrature component data from a data string transferred from the TDMA processing section 5, performs modulation of the π/4 shift QPSK scheme, and outputs the resultant data to the transmitting section 2d of the high frequency section 2.

The TDMA processing section 5 is connected to the modem 4. The TDMA processing section 5 performs frame synchronization and slot format process. In the reception mode, the TDMA processing section 5 extracts one-slot data from a data string (frame) sent from the modem 4 at a predetermined timing. The TDMA processing section 5 extracts a unique word (sync signal) from this data to establish frame synchronization. In addition, the TDMA processing section 5 descrambles control and speech data portions. Thereafter, the TDMA processing section 5 respectively transfers the control data and the speech data to the control section 1 and the speech CODEC 6. In the transmission mode, the TDMA processing section 5 adds control data and the like transferred from the control section 1 to speech data transferred from the speech CODEC 6 and scrambles the resultant data. Subsequently, the TDMA processing section 5 adds a unique word and the like to the data to form one-slot transmission data, inserts the data in a predetermined slot in a frame at a predetermined timing, and outputs the resultant data to the modem 4.

The speech CODEC 6 is connected to the TDMA processing section 5. The speech CODEC 6 codes/decodes digital data. In the reception mode, the speech CODEC 6 decodes an ADPCM speech signal sent from the TDMA processing section 5 into a PCM speech signal, and outputs it to the PCM CODEC 7. In the transmission mode, the speech CODEC 6 codes a PCM speech signal sent from the PCM CODEC 7 into an ADPCM speech signal, and outputs it to the TDMA processing section 5.

The PCM CODEC 7 and the message recording memory 13 (to be described later) are connected to the speech CODEC 6. The PCM CODEC 7 performs analog/digital conversion process for a speech signal. In the reception mode, the PCM CODEC 7 D/A-converts a PCM speech signal sent from the speech CODEC 6, and outputs the resultant analog signal to an amplifier 14 to drive a loudspeaker 15. In the transmission mode, the PCM CODEC 7 A/D-converts an analog speech signal input from a microphone 16, and outputs the resultant PCM speech signal to the speech CODEC 6. In addition, the PCM CODEC 7 controls the volume of the loudspeaker 15 by controlling the amplifier in driving the loudspeaker 15, outputs a signal to a ringer 17, and generates/decodes a DTMF (Dual Tone Multifrequency) signal.

The display section 9 displays input data for various control operations and the resultant data. The ROM 10 is used to store control programs for operation control performed by the control section 1, a plurality of (two in this embodiment) self-ID data (telephone numbers, PS-ID data, and the like) as identification codes, and the like. The working memory 11 is used to temporarily store data used for control performed by the control section 1, and store various conditions set by the key input section 8. The message recording memory 13 is used when the automatic answering telephone function is activated. The message recording memory 13 is used to record messages recorded by the user and incoming messages. The recording/reproducing circuit 12 controls recording/reproduction of messages in/from the message recording memory 13 under the control of the control section 1.

Type B

Figure 4:
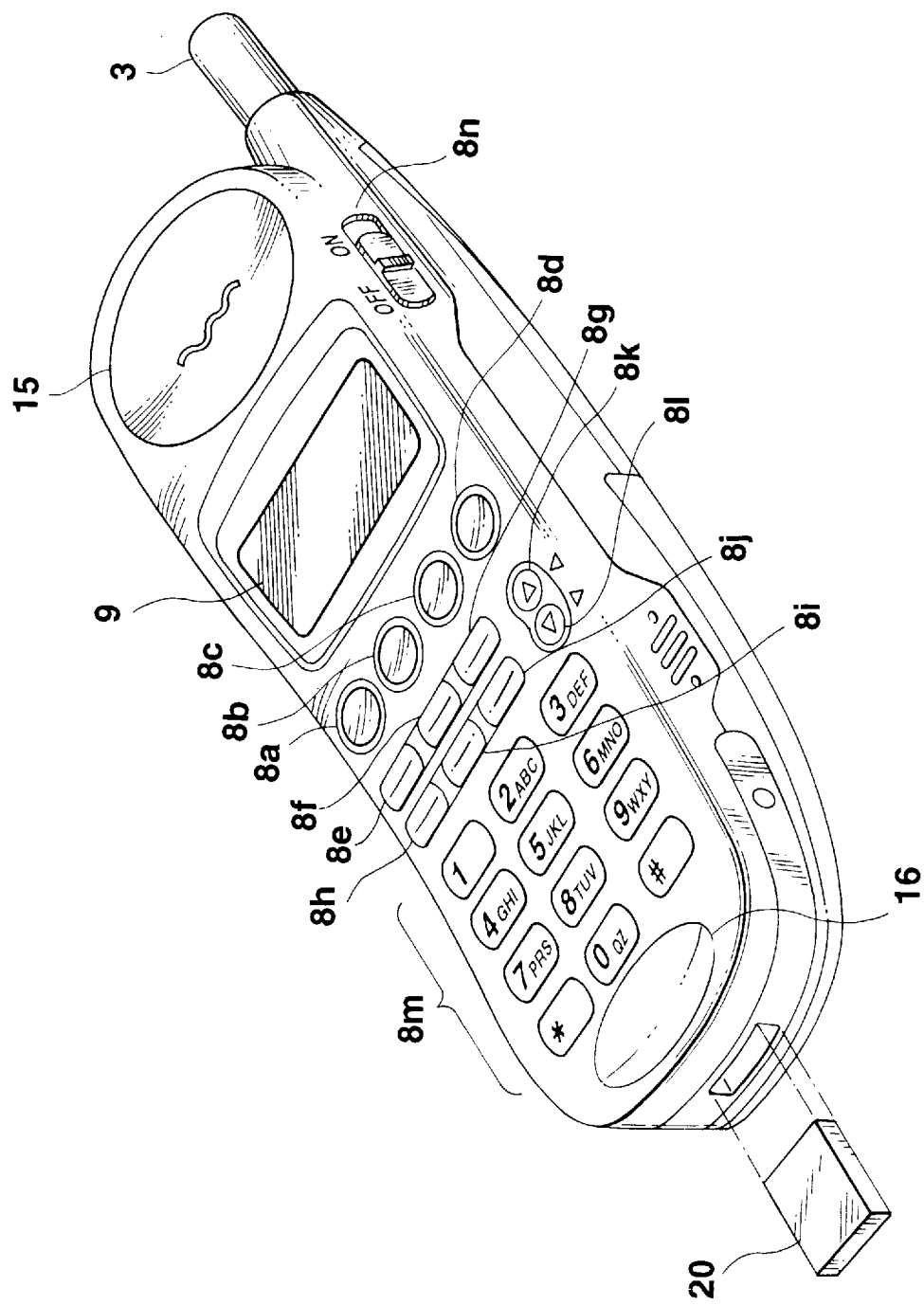
FIG. 4 is a perspective view showing type B of the present invention.
Figure 5:
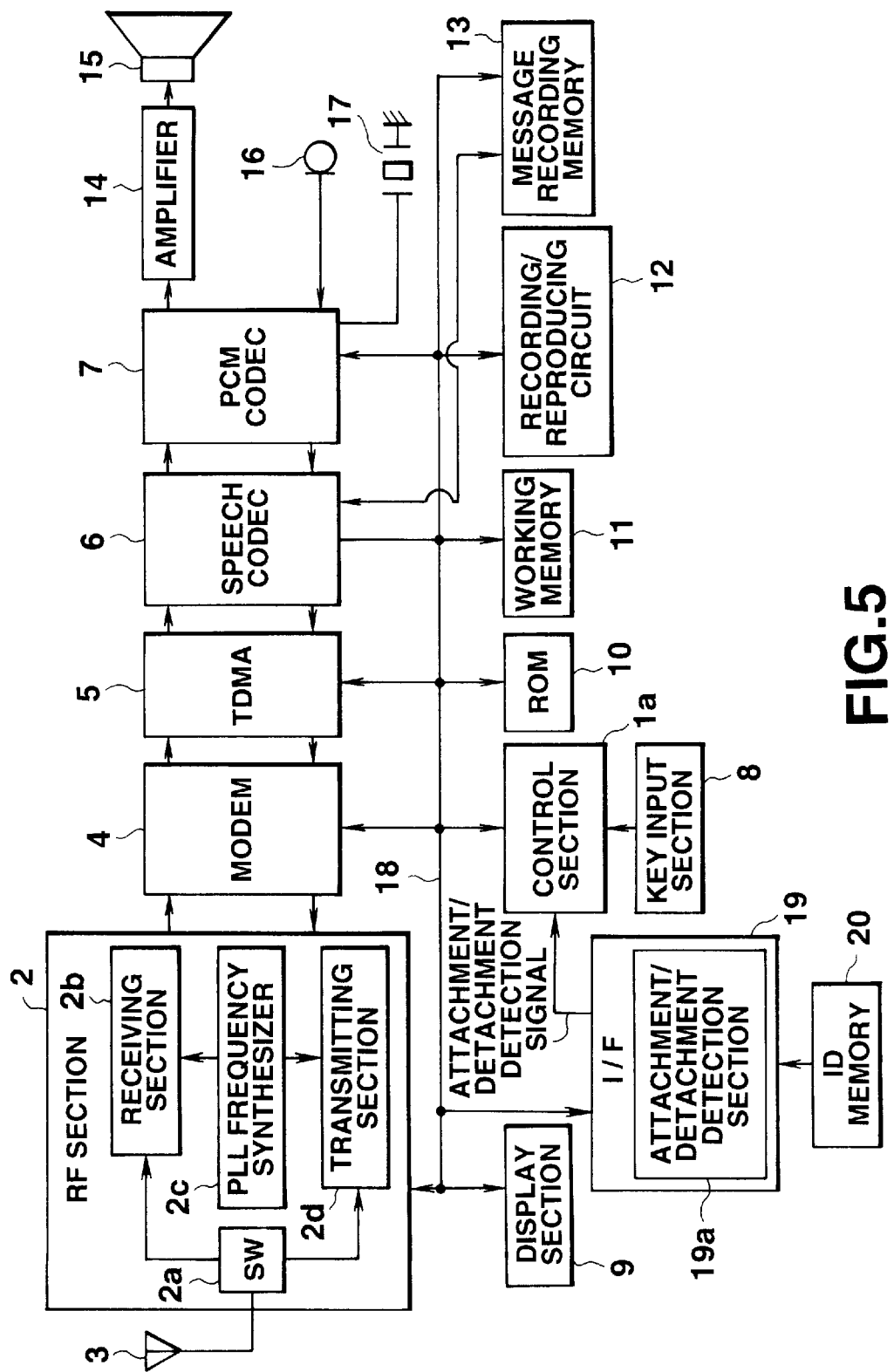
FIG. 5 is a block diagram showing type B of the present invention.

The terminal of type B will be described next with reference to the perspective view of FIG. 4 and the block diagram of FIG. 5. The same reference numerals in FIGS. 4 and 5 showing type B denote the same parts as in FIGS. 2 and 3 showing type A, and a description thereof will be omitted.

Type B is characterized in that the terminal has a detachable memory. Some of a plurality of identification codes are stored in a memory (ROM 10) of the terminal, and the remaining identification codes are stored in a detachable memory (ID memory). In this embodiment, one identification code is stored in the terminal memory, and another identification code is stored in an ID memory 20.

The detachable memory 20 (to be referred to as an ID memory hereinafter) serves to store at least one identification code. An interface 19 detects the mounted state of the ID memory 20 through an attachment/detachment detection section 19a, and outputs an attachment/detachment detection signal to a control section 1a. The interface 19 connects the ID memory 20 to the bus 18 when the memory is mounted.

The control section 1a is basically the same as the control section 1 in FIG. 3, and controls the overall operation of the terminal in accordance with control programs stored in the ROM 10. Especially, setting/collation process for an identification code and setting/control process for the automatic answering telephone function are different from those performed by the control section 1.

In a setting process for an identification code, the control section 1a sets one of a plurality of identification codes which is to be used in a calling operation. With this identification code setting process, one of the plurality of identification codes stored in predetermined areas of the ROM 10 and the ID memory 20 is read out and set in the TDMA processing section 5. In a collation process for an identification code, the control section 1a collates a received identification code with the plurality of identification codes stored in the ROM 10 and the ID memory 20 in a call-incoming operation to identify the received identification code.

In addition, the control section 1a recognizes attachment/detachment of the ID memory 20 on the basis of an attachment/detachment detection signal from the attachment/detachment detection section 19a, and selects the identification code in the ROM 10 or the identification code in the ID memory 20.

Type C

Figure 6:
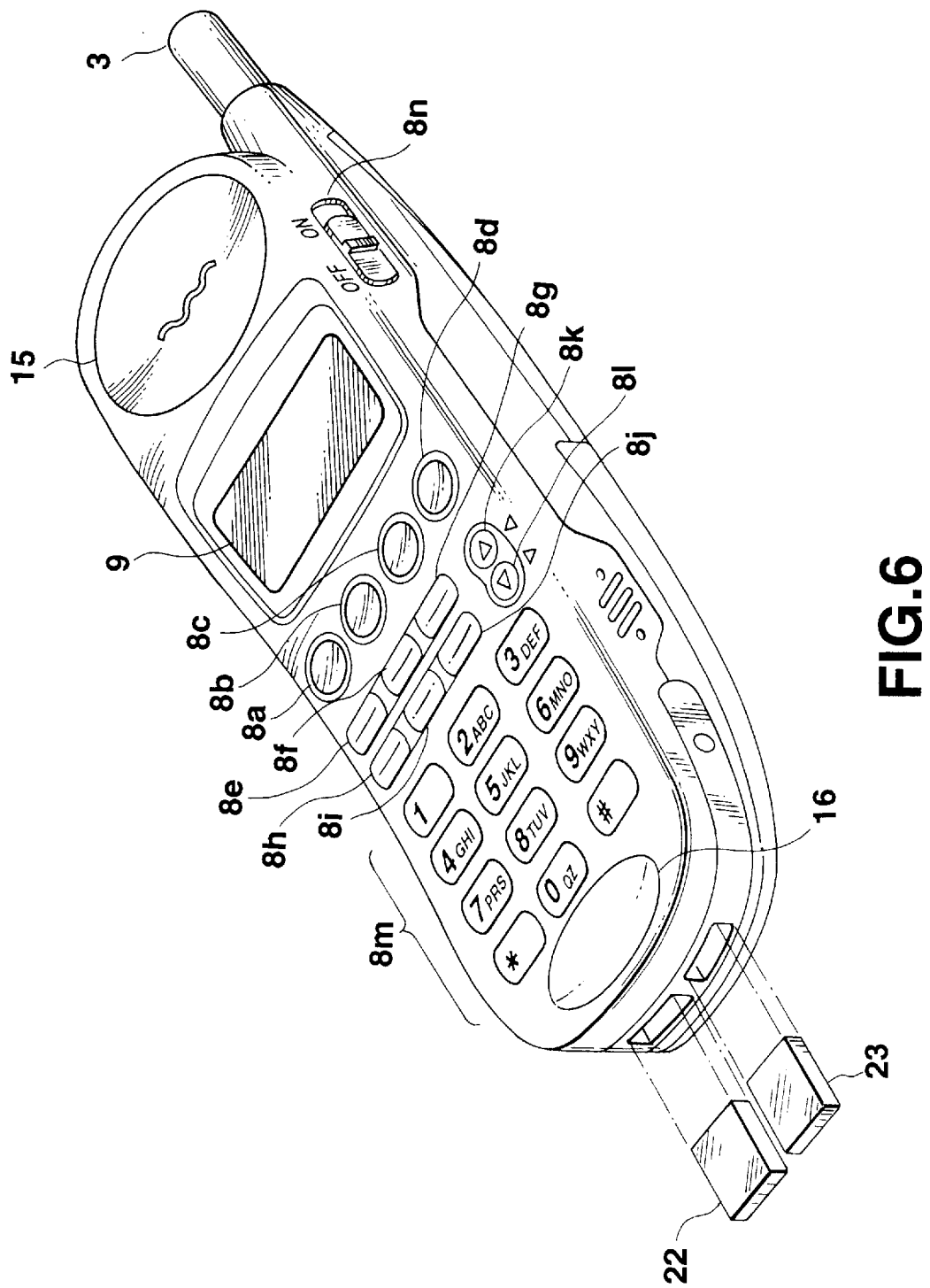
FIG. 6 is a perspective view showing type C of the present invention.
Figure 7:
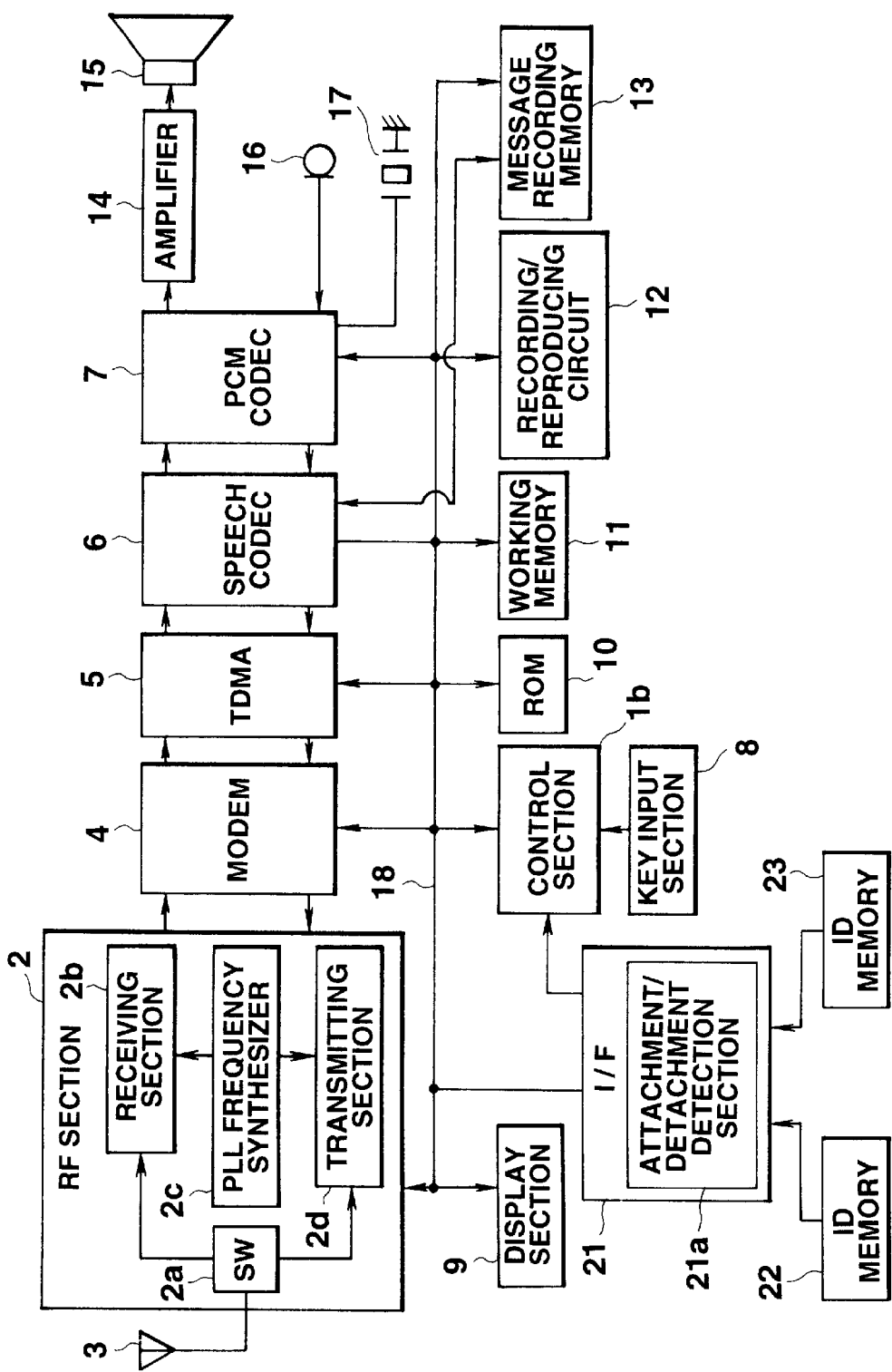
FIG. 7 is a block diagram showing type C of the present invention.

The terminal of type C will be described next with reference to the perspective view of FIG. 6 and the block diagram of FIG. 7. The same reference numerals in FIGS. 6 and 7 showing type C denote the same parts as in FIGS. 2 and 3 showing type A, and a description thereof will be omitted.

Type C is characterized in that the terminal has a plurality of detachable memories. A plurality of identification codes are separately stored in a plurality of detachable memories (ID memories 22 and 23). In this embodiment, one identification code is stored in the ID memory 22, and another identification code is stored in the ID memory 23.

Each of the ID memories 22 and 23 serves to store at least one identification code. An interface 21 detects the mounted states of the ID memories 22 and 23 through an attachment/detachment detection section 21a, and outputs attachment/detachment detection signals to a control section 1b. The interface 21 connects the ID memories 22 and 23 to the bus 18 when the memories are mounted.

The control section 1b is basically the same as the control section 1 in FIG. 3, and controls the overall operation of the terminal in accordance with control programs stored in the ROM 10. Especially, a setting/collation process for an identification code and a setting/control process for the automatic answering telephone function are different from those performed by the control section 1.

In a setting process for an identification code, the control section 1b sets one of a plurality of identification codes which is to be used in a calling operation. With this identification code setting process, one of the plurality of identification codes stored in predetermined areas of the ID memories 22 and 23 is read out and set in the TDMA processing section 5. In a collation process for an identification code, the control section 1b collates a received identification code with the plurality of identification codes stored in the ID memories 22 and 23 in a call-incoming operation to identify the received identification code.

In addition, the control section 1b recognizes attachment/detachment of the ID memories 22 and 23 on the basis of attachment/detachment detection signals from the attachment/detachment detection section 21a, and selects the identification code in the ID memory 22 or the identification code in the ID memory 23.

C. Operation in Terminal Communication

When the power supply is turned on, the terminal having one of the above arrangements (type A, type B, and type C) searches for a control carrier (a radio wave having a predetermined frequency) from a base state to set a control channel which can be currently pulled in.

More specifically, this control carrier is received through the antenna 3 and frequency-converted into an IF signal by the receiving section 2b of the high frequency section 2. This reception IF signal is subjected to π/4 shift QPSK demodulation process in the modem 4 to be converted into a data string. This data string undergoes a synchronization process in the TDMA processing section 5, and the resultant control data is transferred to the control section 1. The control section 1 executes a calling process or call-incoming process on the basis of this control data.

When communication is to be performed, assignment of a communication channel is requested with respect to a base station by using the above control channel. With this operation, a communication path for the base station is connected by using an assigned communication channel in accordance with a predetermined procedure. A destination subscriber number is input via the base station, and communication is started when the destination terminal responds.

In the reception mode, a wave received through the antenna 3 is frequency-converted into an IF signal by the receiving section 2b. This reception IF signal is demodulated by the modem 4 to be converted into a data string. After the data is descrambled by the TDMA processing section 5, the control data is transferred to the control section 1, and the speech data (ADPCM signal) is transferred to the speech CODEC 6. This speech data is decoded by the speech CODEC 6 to be converted into a PCM signal. This PCM signal is digital/analog-converted by the PCM CODEC 7, and the resultant data is supplied to the loudspeaker 15 via the amplifier 14 to generate a sound.

In the transmission mode, a speech signal from the microphone 16 is A/D-converted by the PCM CODEC 7 and coded into an ADPCM code by the speech CODEC 6. This coded speech data is subjected to scrambling or the like in the TDMA processing section 5. The resultant data is inserted in a slot at a predetermined timing. The modem 4 performs π/4 shift QPSK modulation processing for the data. The transmitting section 2d frequency-converts the data into a signal in a 1.9-GHz band. The signal is then radiated from the antenna 3.

D. Types and Combinations of Identification Codes

Identification codes used in the PHS:

① Private subscriber numbers assigned to private base stations.

In practice, these codes are based on an assumption that a call-incoming/calling process is performed by terminals. For this reason, such a private subscriber number can be designated when a terminal is connected to a private base station by using a private base station ID number (CS-ID) and a terminal ID number (PS-ID).

② Public subscriber numbers assigned for communication via public base stations.

③ Terminal numbers assigned for extension communication or inter-terminal direct communication.

In practice, when inter-terminal direct communication is to be performed, a terminal number is used together with part (system call code) of a CS-ID to indicate a subordinate relationship with a base station. That is, this system call code is used, with a terminal number being added thereto, to call a destination terminal.

Private and public subscriber numbers are so-called telephone numbers assigned by a communication service company. A private subscriber number is assigned to a communication line connected to the private base station 3000c or 3000b in FIG. 1. In practice, this private subscriber number is assigned to the private base station 3000c or 3000b. A public subscriber number is assigned to the terminal 4000 which can be called via the public base station 3000a.

A terminal number is provided by the user and is used to perform extension communication or inter-terminal direct communication between the terminals 4000 via the private base station 3000c or 3000b.

Various combinations of these identification codes are available. Several combinations will be presented as typical examples. Note that some combinations are characteristic depending on the above types of terminals.

Type A (1) private subscriber number+public subscriber number+terminal number (including a system call code), (2) a plurality of private subscriber numbers, (3) a plurality of public subscriber numbers, (4) a plurality of terminal numbers (including system call codes).

Type B (1) terminal body: private subscriber number ID memory: public subscriber number+terminal number (including a system call code), (2) terminal body: public subscriber number ID memory: private subscriber number+terminal number (including a system call code).

Type C (1) private subscriber number+public subscriber number+terminal number (including a system call code), (2) a plurality of private subscriber numbers,
(3) a plurality of public subscriber numbers,
(4) a plurality of terminal numbers (including system call codes).

According to type A, a plurality of identification codes in the ROM 10 of the terminal body are selected. According to type C, a plurality of detachable ID memories (22 and 23) in which identification codes are respectively stored are selected. That is, types A and C are the same in that identification codes are selected from the same type of medium.

However, type B is different from the above types in that identification codes are selected from the terminal ROM 10 and the ID memory 20. That is, a combination (1) is optimal when priority is given to the indoor use of the terminal. However, a combination (2) is optimal when priority is given to the outdoor use of the terminal. As described above, the optimal storage method changes depending on the lifestyle of the user. If one ID memory is fixed to the terminal body of type C, while the other memory is detachably mounted, the terminal is equivalent to the terminal of type B.

The above combinations are merely examples and hence may be further combined with each other.

The memory structure of part of the ROM 10 of the terminal body or the ID memory 20, 22, or 23 will be described next with reference to FIG. 8.

Figure 8:
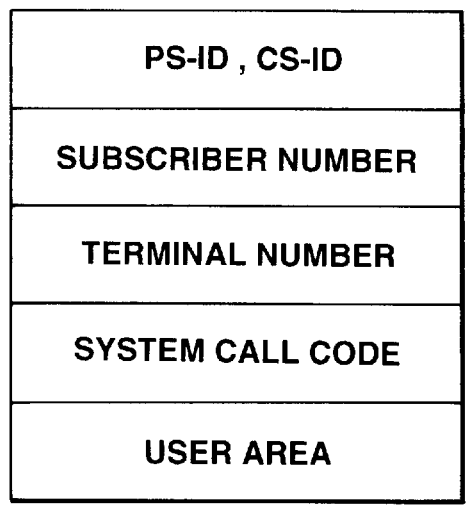
FIG. 8 is a view for explaining the structure of a main memory or a detachable memory which is used to store identification codes.

Referring to FIG. 8, "PS-ID" and "CS-ID" are ID data of a terminal and a base station. These ID data are used to connect the terminal, the base station, and a radio channel to each other. Subscriber number is a so-called telephone number, which is used to execute radio communication via a public base station. Terminal number is a number assigned to a terminal by the user. This terminal number is used when a destination terminal is called or the our terminal is called by a destination terminal in performing extension communication or inter-terminal direct communication via a private base station. Note that the our terminal number and the destination terminal number are stored in the terminal number. System call code is a code used, with a terminal number being added thereto, to execute inter-terminal direct communication. This system call code is part of the CS-ID data of a private base station. User area is an area for storing the individual information of the user.

E. Calling Operation

Methods of selecting identification codes in calling operations will be described next. Various cases are assumed in the selection methods.

Case 1: The user performs a switching operation by operating the key input section of the terminal body.

Case 2: Public and private subscriber numbers are selectively switched in accordance with a pull-in radio wave from a base station. This operation is a characteristic for only a terminal having public and private subscriber numbers.

Case 3: A switching operation is structurally performed. This operation is a characteristic for only a terminal having a detachable ID memory. That is, this method can be applied to type B or C.

Figure 9:
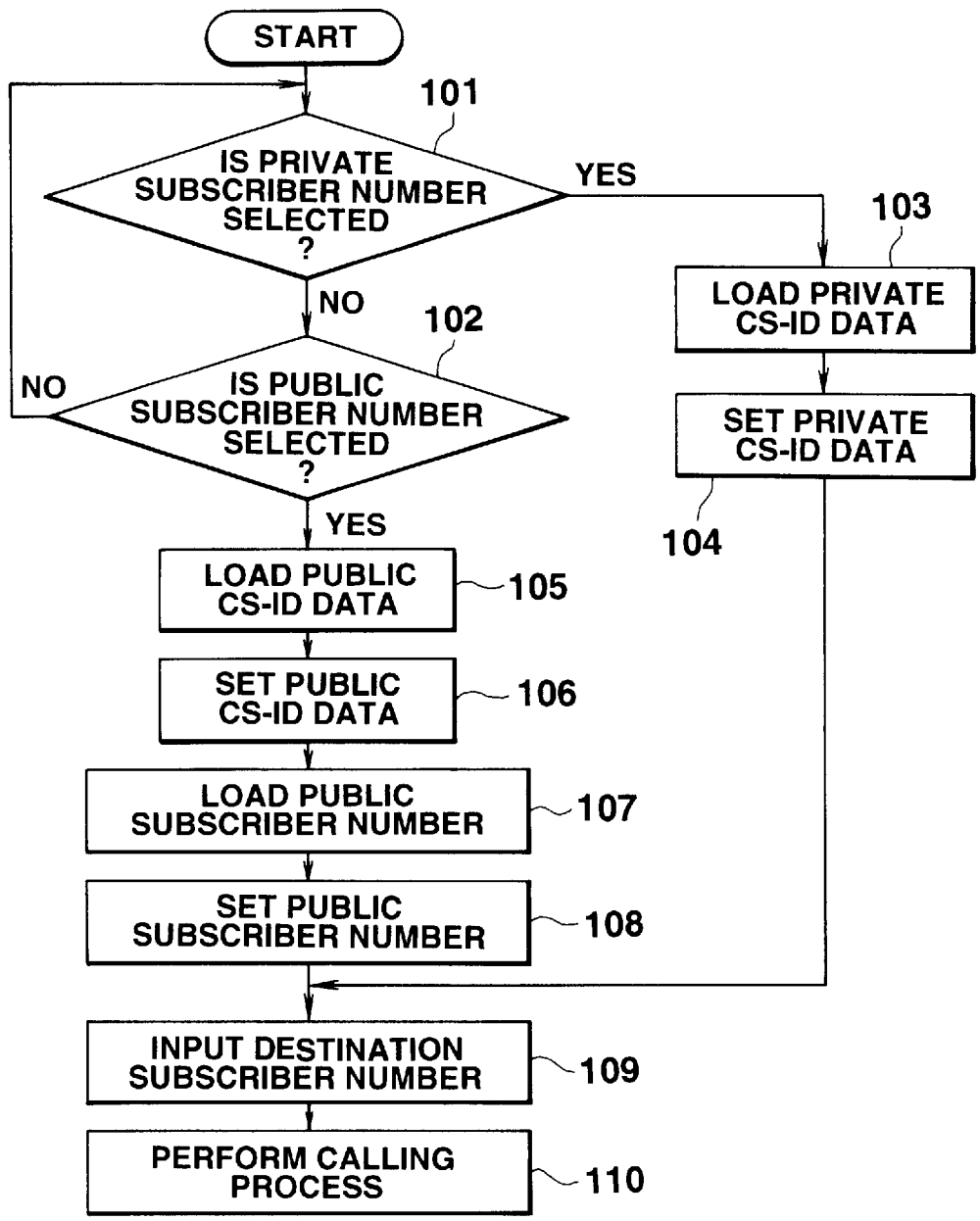
FIG. 9 is a flow chart for explaining a first control method of switching identification codes in a calling operation of a radio communication apparatus of the present invention.

In the case 1, one identification code is selected from a plurality of identification codes by operating the key input section 8, and a calling operation is performed. FIG. 9 shows the case 1. In the case shown in FIG. 9, one subscriber number is selected from two identification codes (private and public subscriber numbers). With this operation, one of the subscriber numbers which is to be used to perform a calling operation is determined. When this subscriber number is transmitted, an object to be charged is determined. In this case, the private subscriber number is a number assigned to a private base station in practice. A terminal can designate the private subscriber number by designating the CS-ID data of the private base station.

More particularly, referring to FIG. 9, first a subscriber number (private or public subscriber number) as an object to be charged is designated by operating the identification code setting key 8*d* of the key input section 8 (steps 101 and 102). If it is determined in step 101 that the private subscriber number is selected, the CS-ID and PS-ID data of the private base station are read out from a memory (the terminal ROM 10 or the ID memory 20, 22, or 23) (step 103), and are set, as link information for the private base station, in the TDMA processing section 5 (step 104). If it is determined in step 102 that the public subscriber number is selected, the CS-ID stored in the working memory 11 and the PS-ID data stored in a memory (the ROM 10 or the ID memory 20, 22, or 23) are read out and set, as link information for the public base station, in the TDMA processing section 5 (steps 105 and 106). The public subscriber number stored, as caller information, in a memory (the terminal ROM 10 or the ID memory 20, 22, or 23) is read out and set in the TDMA processing section 5 (steps 107 and 108).

With this operation, one of the private base stations 3000*c* and 3000*b* or the public base station 3000*a* to which a communication channel is to be connected is determined. When the subscriber number of a person to be called is input (step 109), and the calling key 8*a* of the key input section 8 is operated, a link with the corresponding base station is established on the basis of the CD-ID data set in step 104 or 106. The destination subscriber number is transmitted to the private base station or the caller ID information and the destination subscriber number are transmitted to the public base station in accordance with a predetermined procedure (step 108).

Figure 10:
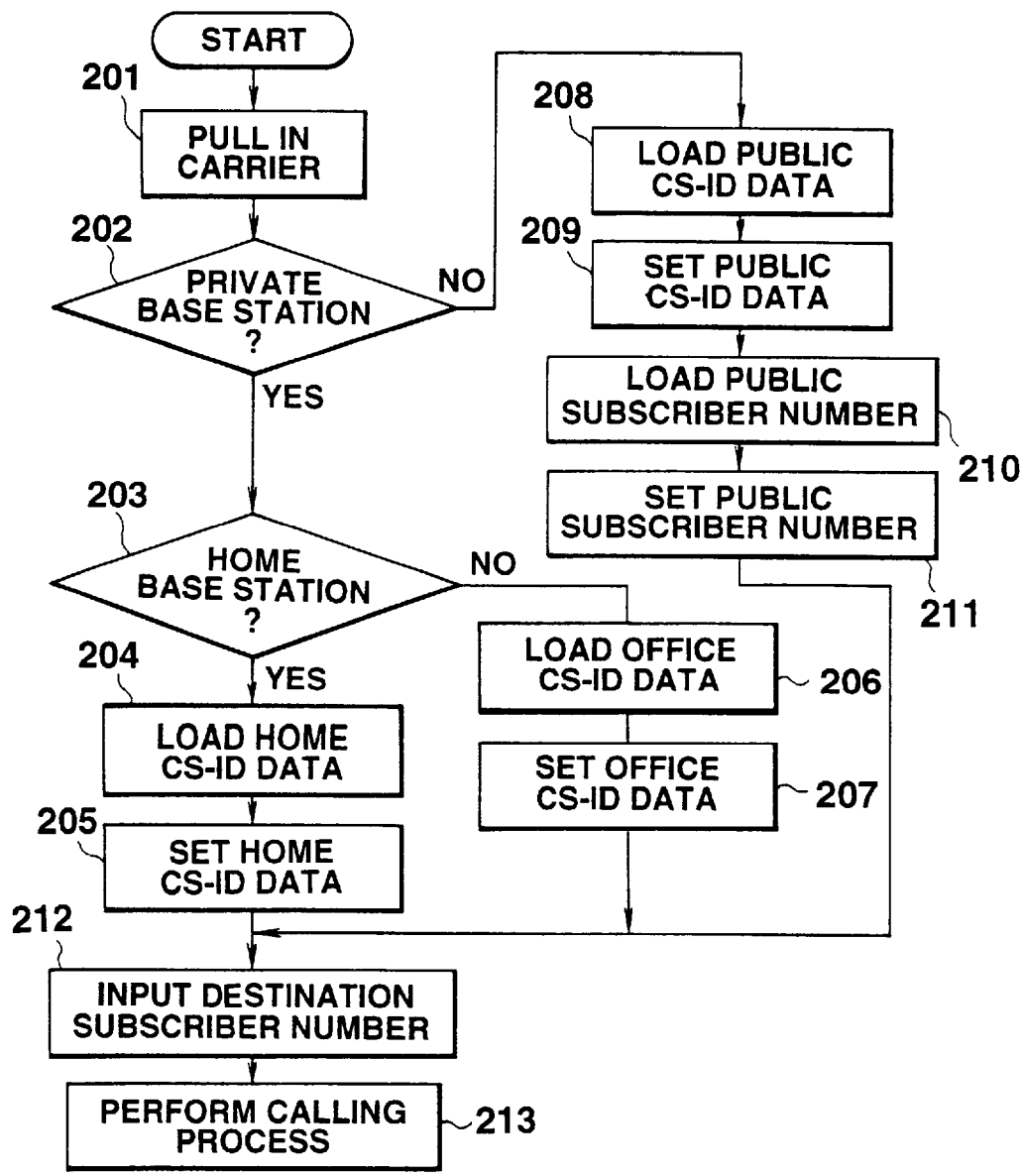
FIG. 10 is a flow chart for explaining a second control method of switching identification codes in a calling operation of a radio communication apparatus of the present invention.

In the case 2, a radio wave from a base station is pulled in to specify the base station which can be currently connected. With this operation, a subscriber number as an object to be charged is automatically selected to perform a calling operation. FIG. 10 shows the case 2. In the case shown in FIG. 10, a subscriber number assigned to a home base station (in practice, this subscriber number is selected by designating the CS-ID data of the home base station), a subscriber number assigned to an office base station (in practice, this subscriber number is selected by designating the CS-ID data of the office base station), or a subscriber number assigned to a public base station is selected.

In other words, referring to FIG. 10, a control channel from a base station which can be currently connected is pulled in to extract control information (CS-ID data and the like) from the base station (step 201). The base station which can be currently connected is identified (home, office, or public base station) on the basis of this CS-ID data (steps 202 and 203). If it is determined in step 203 that the base station is the home base station, the CS-ID data of the home base station is read out from the ROM 10 or the ID memory 20, 22, or 23 (step 204) and is set, as calling information, in the TDMA processing section 5 (step 205). If it is determined in step 203 that the base station is the office base station, the CS-ID data of the office base station is read out from the ROM 10 or the ID memory 20, 22, or 23 (step 206) and is set, as calling information, in the TDMA processing section 5 (step 207). If it is determined in step 202 that the base station is the public base station, the CS-ID data of the public base station is read out from the RAM 11 and is set, as calling information, in the TDMA processing section 5 (steps 208 and 209). In addition, the public subscriber number is read out from the ROM 10 or the ID memory 20, 22, or 23 and is set, as caller information, in the TDMA processing section 5 (steps 210 and 211).

While the calling information is set, the destination subscriber number of a person to be called is input (step 212), and the calling key 8*a* of the key input section 8 is operated. As a result, a link with the corresponding base station is established. If a link with a private base station is established, the destination subscriber number is transmitted to the base station. If a link with the public base station is established, the destination subscriber number and the caller information are transmitted to the base station (step 213). In this case, the home or office base station outputs the private subscriber number assigned as the caller information.

Figure 11:
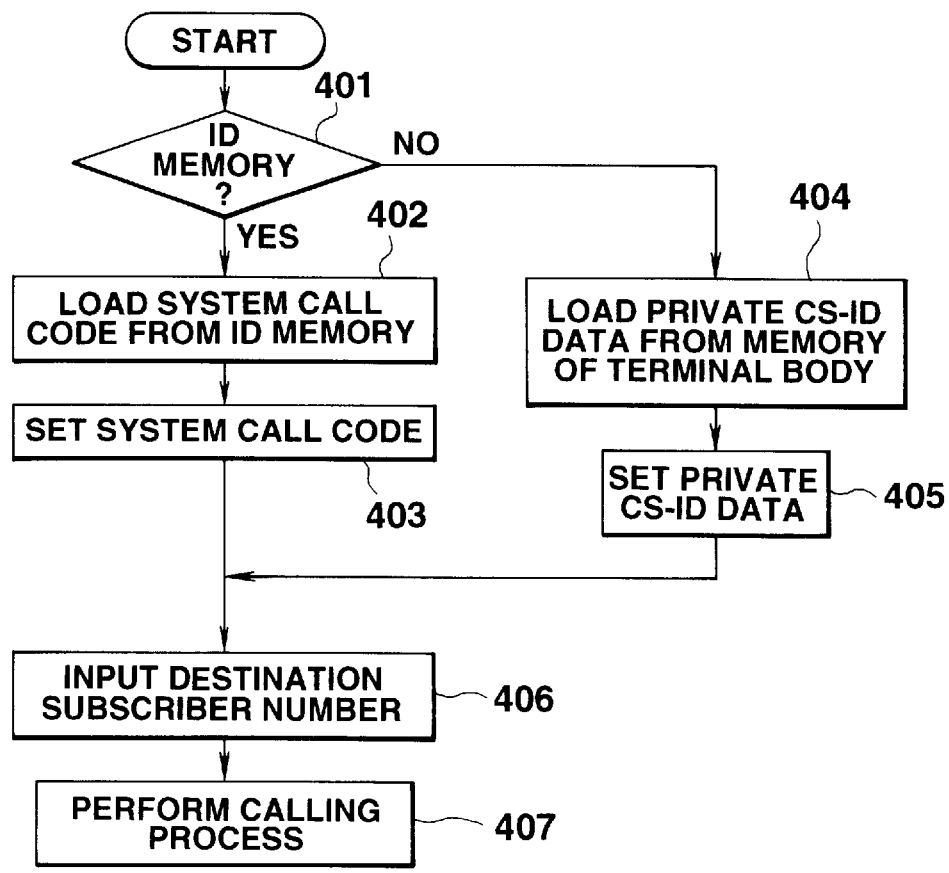
FIG. 11 is a flow chart for explaining a third control method of switching identification codes in a calling operation of a radio communication apparatus of the present invention.

In the case 3, identification information is switched in accordance with the mounted state of a detachable memory. FIG. 11 shows the case 3. In the case shown in FIG. 11, private CS-ID data is stored in the ROM 10 of the terminal body, and a system call code (part of the private CS-ID data) for inter-terminal direct communication is stored in the ID memory 20. The ID memory 20 is mounted in the terminal body.

The control section 1*a* determines the mounted state of the ID memory 20 on the basis of an attachment/detachment detection signal from the attachment/detachment detection section 19*a* (step 401). If it is determined in step 401 that the ID memory 20 is mounted, the system call code stored in the ID memory 20 is read out and set in the TDMA processing section 5 (steps 402 and 403). If it is determined in step 401 that the ID memory 20 is not mounted, the private CS-ID data is loaded from the ROM 10 of the terminal body to be set in the TDMA processing section 5 (steps 404 and 405). If the system call code from the ID memory 20 is set, a three digit of destination terminal number is input. If the private CS-ID data from the ROM 10 is set, a destination subscriber number is input (step 406). The calling key 8*a* of the key input section 8 is then operated. In this case, if the ID memory 20 is mounted, the system call code is output, with the destination terminal number being added thereto, by using a carrier for inter-terminal direct communication. If the private CS-ID data from the ROM 10 is set, a link with the private base station is established, and the destination subscriber number is output.

In the cases 1 to 3 described above, the stored contents of the ROM 10 or the ID memory 20, 22, or 23 are merely examples. Various combinations other than the above combinations are available, as described above. The cases 1 to 3 can be properly changed in accordance with such combinations. According to the above description, for example, one identification code corresponds to one memory. If, however, a plurality of identification codes correspond to one memory, one of the plurality of identification codes must be selected. In addition, if different code forms are used depending on selected identification codes, the identification codes must be stored in corresponding forms.

F. Call-incoming Operation

Various call-incoming operations are conceivable. For example, since a plurality of incoming calls can be received by one terminal, priority must be given to a specific one of the incoming calls. Also, a specific operation for a call to a subscriber number for which no call-incoming operation is desired must be determined (in consideration of the automatic answering telephone function). These are the main concerns in a call-incoming process.

Type α: Call-incoming process is set in advance by a key operation. Normal call-incoming process and the automatic answering telephone function are set.

Type β: Call-incoming process is set in accordance with a schedule (time).

i) Explanation of type α

Figure 12A:
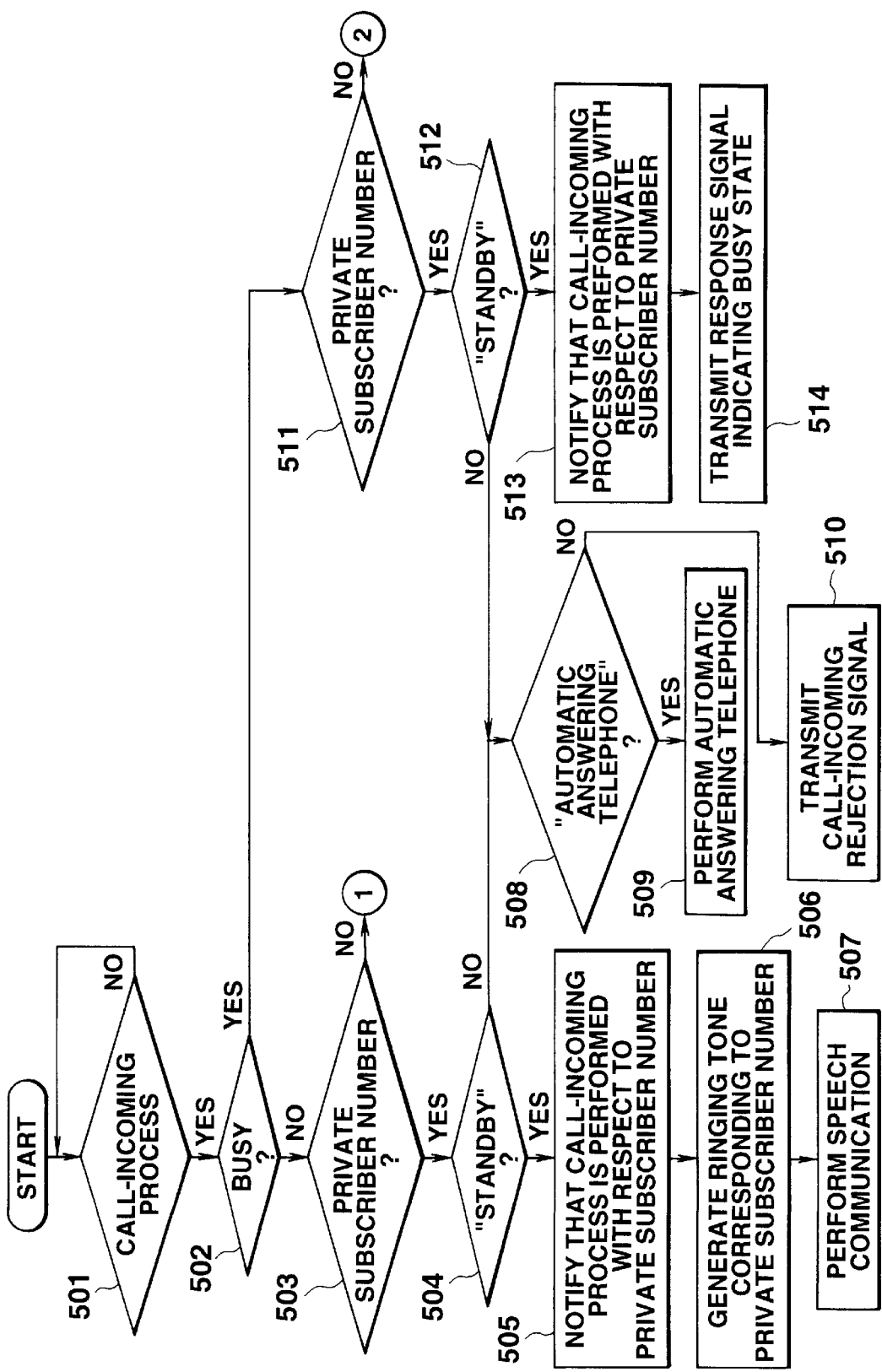
FIGS. 12A and 12B are flow charts for explaining a first control method of switching control of the radio communication apparatus of the present invention by using an identification code in a call-incoming operation of the apparatus.
Figure 12B:
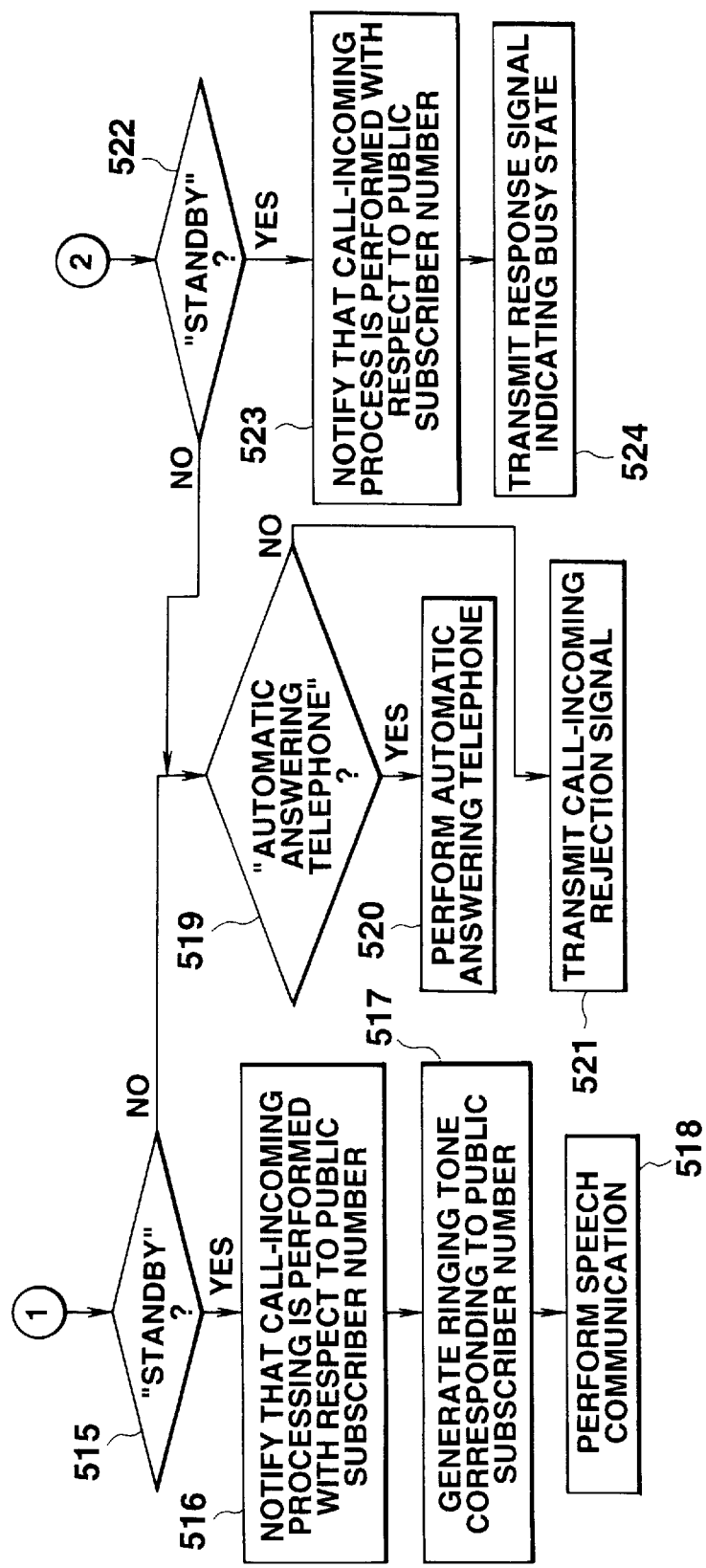

FIGS. 12A and 12B are flow charts for explaining type α. In this embodiment, a standby state ("standby", "automatic answering telephone", or "call-incoming rejection") is set in the working memory 11 in advance for each subscriber number. For the sake of descriptive convenience, a call-incoming process based on two subscriber numbers (a private subscriber number and a public subscriber number) will be described below. Note that a call-incoming process based on the public subscriber number is performed by the terminal itself. However, in a call-incoming process based on the private subscriber number, the terminal is called after an incoming call is received by a private base station.

As shown in FIG. 12A, each of the control sections 1, 1*a*, and 1*b* checks for each subscriber number in a standby state whether a call-incoming process is performed (step 501). If it is determined that a call-incoming process is performed with respect to one subscriber number, it is checked whether speech communication is being performed on the basis of another subscriber number (private or public subscriber number) (step 502). If the busy state is not set, it is checked whether the call-incoming process is performed with respect to the private subscriber number (step 503). That is, a specific call-incoming process is determined by comparing the subscriber number in the control data extracted by the TDMA processing section 5 with the subscriber number stored in the ROM 10 in the terminal or the detachable ID memory 20, 22, or 23.

If it is determined that the call-incoming process is performed with respect to the private subscriber number, it is checked whether the standby state stored in the working memory 11 for the private subscriber number is "standby" (step 504). If it is determined that the standby state is "standby", information indicating that the call-incoming process is performed with respect to the private subscriber number is displayed on the display section 9 (step 505). In addition, a ringing tone for the private subscriber number is generated (step 506). When the user operates the communication key of the key input section 8, communication is started (step 507).

If it is determined in step 504 that the standby state is not "standby", it is checked on the basis of the stored contents of the working memory 11 whether the standby state is "automatic answering telephone" (step 508). If "automatic answering telephone" is set, the channel is connected, and an outgoing message stored in the message recording memory 13 in advance is read out by the recording/reproducing circuit 12. The transmission signal is then output from the antenna 3 to the base station via the speech CODEC 6, the TDMA processing section 5, the modem 4, and the high frequency section 2 (step 509). When the destination terminal receives the message input via the base station, the message is recorded in the message recording memory 13 in a reverse order to the above procedures.

If it is determined in step 508 that the standby state is not "automatic answering telephone", it is determined that the standby state is "call-incoming rejection", and a call-incoming rejection signal is transmitted to the base station (step 510).

If it is determined in step 503 that the call-income process is not performed with respect to the private subscriber number, it is determined that the call-income process is performed with respect to the public subscriber number. Therefore, in step 515 in FIG. 12B, it is checked whether the standby state stored in the working memory 11 with respect to the public subscriber number is "standby" (step 515). If "standby" is determined, information indicating that the call-income process is performed with respect to the public subscriber number is displayed on the display section 9 in step 516. In step 517, a ringing tone for the public subscriber number is generated. When the user operates the communication key of the key input section 8 in step 518, communication is started.

If it is determined in step 515 that the standby state is not "standby", it is checked in step 519 whether the standby state stored in the working memory 11 is "automatic answering telephone" (step 519). If "automatic answering telephone" is determined, the channel is connected in step 520, and the outgoing message stored in the message recording memory 13 is read out by the recording/reproducing circuit 12. The transmission signal is then output from the antenna 3 to the base station via the speech CODEC 6, the TDMA processing section 5, the modem 4, and the high frequency section 2. When the destination terminal receives the message input via the base station, the message is recorded in the message recording memory 13 in a reverse order to the above procedures.

If it is determined in step 519 that the standby state is not "automatic answering telephone", it is determined that the standby state is "call-incoming rejection", and a call-incoming rejection signal is transmitted to the base station (step 521).

Referring back to FIG. 12A, if it is determined in step 502 that the busy state is set, it is checked whether the current call-incoming process is performed with respect to the private subscriber number (step 511). If it is determined that the call-incoming process is performed with respect to the private subscriber number, it is checked on the basis of the stored contents of the working memory 11 whether the standby state corresponding to the subscriber number is "standby" (step 512). If "standby" is determined in step 512, information indicating that the call-incoming process is performed with respect to the private subscriber number is displayed on the display section 9 (step 513). In addition, a response signal indicating a busy state is output to the caller (step 514).

If it is determined in step 512 that the standby state is not "standby", an automatic answering telephone outgoing message (steps 508 and 509) or a call-incoming rejection signal (steps 508 and 510) is transmitted on the basis of the standby state "automatic answering telephone" or "call-incoming rejection", as described above.

If it is determined in step 511 that the call-income process is not performed with respect to the private subscriber number, it is determined that the call-income process is performed with respect to the public subscriber number. Therefore, the flow advances to step 522 to check on the basis of the stored contents of the working memory 11 whether the standby state corresponding to the public subscriber number is "standby" (step 522). If "standby" is determined in step 522, information indicating that the call-incoming process is performed with respect to the public subscriber number is displayed on the display section 9 (step 523). In addition, a response signal indicating a busy state is output to the caller (step 524).

If it is determined in step 522 that the standby state is not "standby", an automatic answering telephone outgoing message (steps 519 and 520) or a call-incoming rejection signal (steps 519 and 521) is transmitted on the basis of the standby state "automatic answering telephone" or "call-incoming rejection", as described above.

ii) Explanation of type β

Figure 13:
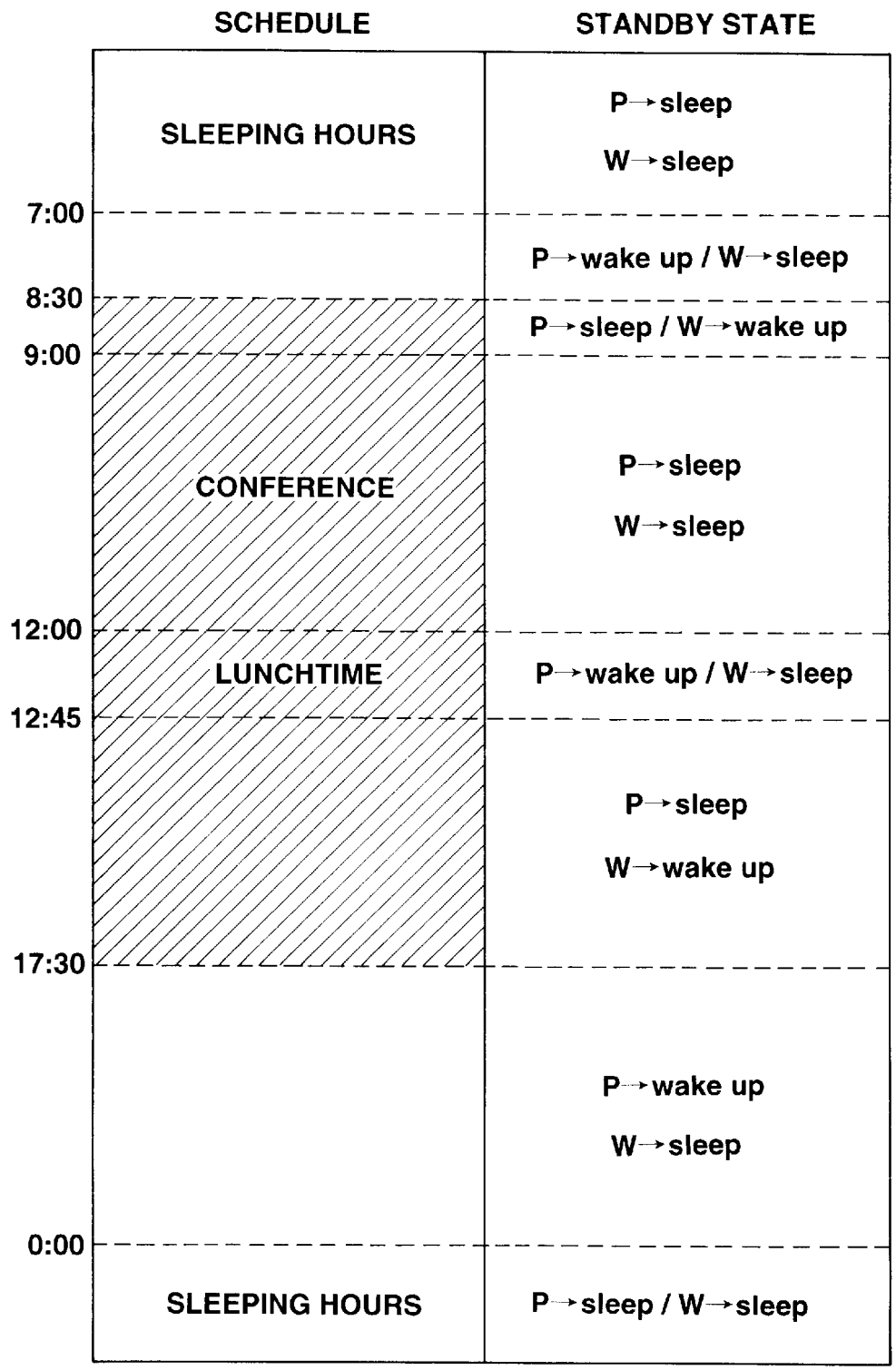
FIG. 13 is a status chart for explaining a second control method of switching control of the radio communication apparatus of the present invention by using an identification code in a call-incoming operation of the apparatus.
Figure 14:
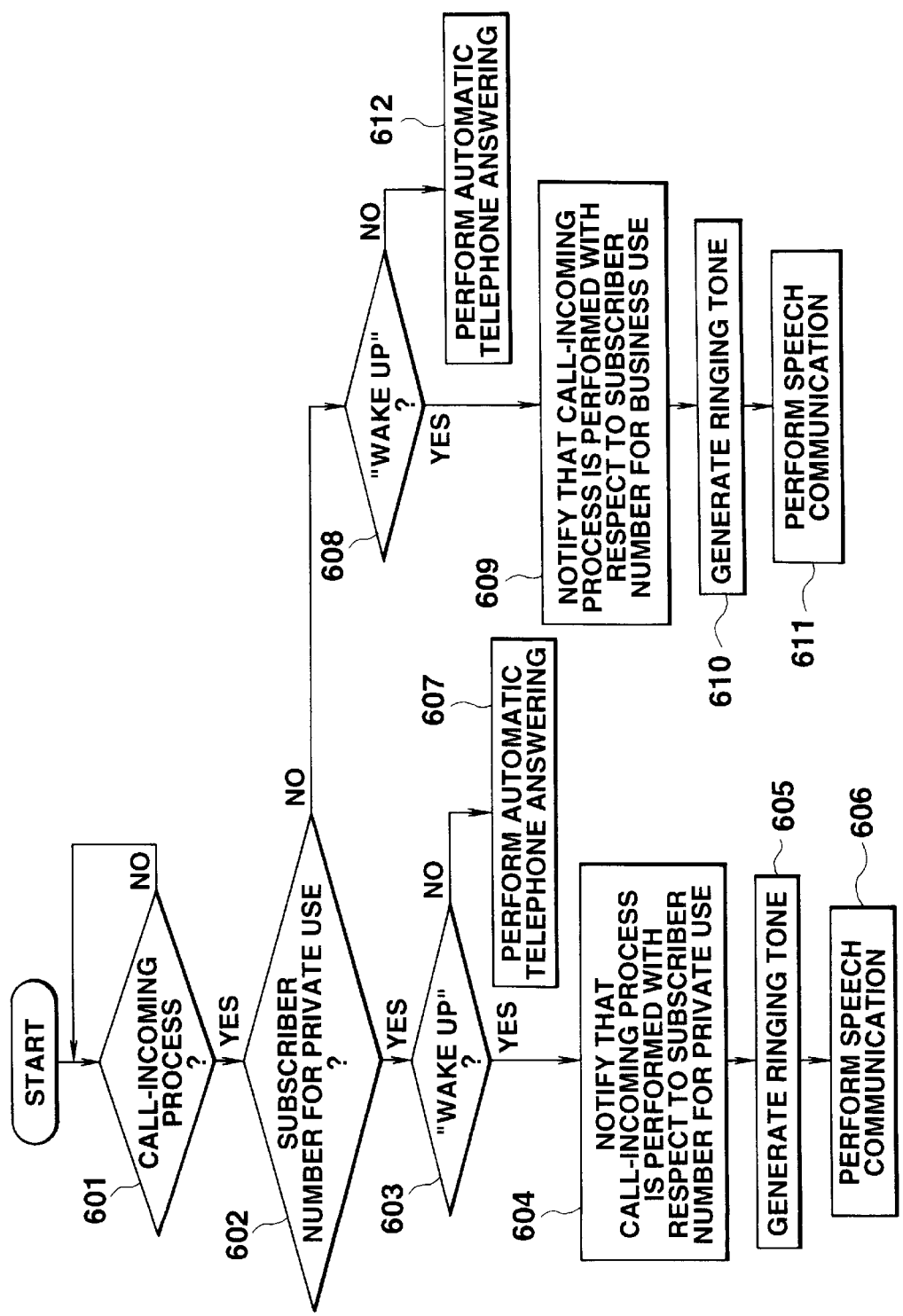
FIG. 14 is a flow chart for explaining the second control method of switching control of the radio communication apparatus of the present invention by using an identification code in a call-incoming operation of the apparatus.

FIGS. 13 and 14 are views for explaining type β. FIG. 13 shows the relationship between a schedule and the standby state corresponding to each subscriber number (this view corresponds to a portion of the working memory 11). FIG. 14 is a flow chart showing an operation based on the contents of the working memory 11. For the sake of descriptive convenience, as in the description of type A, a case of two subscriber numbers will be described below. In order to describe an actual method of using subscriber numbers, it is assumed that one subscriber number is for private use (represented by "P"), and the other subscriber number is for business use (represented by "W"). In this method, an automatic telephone answering mode (represented by "sleep") and a normal call-incoming mode (represented by "wake up") are switched in accordance with a schedule.

Assume that in FIG. 13, the schedule in the working memory 11 is set like the schedule. During sleeping hours, call-incoming process for the subscriber numbers for private use and business use are set in "sleep". During working hours, the subscriber number for private use is set in "sleep", and the subscriber number for private use is set in "wake up". Even during working hours, in a conference, the subscriber number for business use is changed to "sleep". During private hours, the subscriber number for private use is set in "wake up", and the subscriber number for business use is set in "sleep". Note that an outgoing message during "sleep" is changed in accordance with the contents of a schedule. For example, during sleeping hours, "I am in bed now, so please leave a message" is output. If in a conference, "I am in conference, so please leave a message" is output.

The flow chart shown in FIG. 14 is executed on the basis of the contents set in the working memory 11. If call-incoming process is performed in a standby state (step 601), it is checked, on the basis of a plurality of subscriber numbers stored in the ROM 10 of the terminal body or the detachable ID memory 20, 22, or 23, whether this call-incoming process is performed with respect to the subscriber number for private use (step 602). If the call-incoming process is performed with respect to the subscriber number for private use, it is checked in step 603, on the basis of the conditions stored in the working memory 11, whether the subscriber number of private use is in "wake up" (normal call-incoming mode).

If the normal call-incoming mode is determined, information indicating that a call-incoming process is performed with respect to the subscriber number of private use is displayed on the display section 9 (step 604). In addition, a ringing tone indicating that a call-incoming process is performed with respect to the subscriber number of private use is generated (step 605). When the user operates the communication key of the key input section 8 in response to this ringing tone, speech communication is started.

If it is determined in step 603 that the standby state is "sleep", the flow advances to step 607. In step 607, an outgoing message which is stored in the message recording memory 13 by the user is read out by the recording/reproducing circuit 12 and is transmitted to the caller. When the caller inputs a message in response to this message, the incoming message is stored in the message recording memory 13.

If it is determined in step 602 that the call-incoming process is not performed with respect to the subscriber number for private use, it is determined that the call-incoming process is performed with respect to the subscriber number for business use. It is then checked whether the standby state corresponding to the subscriber number for business use in working memory 11 is "wake up" (step 608). If "wake up" is determined, information indicating that call-incoming process is performed with respect to the subscriber number for business use is displayed (step 609). In addition, in step 610, a ringing tone indicating that a call-incoming process is performed with respect to the subscriber number for business use is generated (step 610). When the user operates the communication key of the key input section 8 in response to this ringing tone, communication is started.

If it is determined in step 608 that the standby state is "sleep", the flow advances to step 612. In step 612, an outgoing message which is stored in the message recording memory 13 by the user is read out by the recording/reproducing circuit 12 and is transmitted to the caller. When the caller inputs a message in response to this message, the incoming message is stored in the message recording memory 13.

In the above call-incoming operation, call-incoming process is switched in accordance with the two subscriber numbers. However, the present invention is not limited to this. For example, a private subscriber number and a public subscriber number or an ID number for inter-terminal direct communication may be switched.

In addition, in the present invention, calling/call-incoming process is executed via a public base station by using a public subscriber number. However, the present invention is not limited to this. If the center 2000 has a database in which public subscriber numbers are stored in correspondence with PS-ID data, a calling/call-incoming process can be executed by using PS-ID data.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radio communication apparatus assigned to a plurality of identification codes for performing communication based on one of the assigned identification codes via base stations connected to communication networks, comprising:

means for receiving said one assigned identification code from said base stations;

means for notifying incoming calls in different ways corresponding to respective assigned identification codes, said notifying means notifying in a predetermined way based on said received identification code;

time table storing means for storing a time table;

means for storing call-incoming states corresponding to the plurality of identification codes on the basis of the time table stored in said time table storing means;

means for comparing the identification code received by said receiving means with the identification codes stored in said storing means; and means for controlling a call-incoming process in accordance with a call-incoming state corresponding to identification codes, coincidence of which is determined by said comparing means.

2. An apparatus according to claim 1, wherein said notifying means includes display means for displaying a symbol corresponding to the identification code.

3. An apparatus according to claim 1, wherein said notifying means includes acoustic signal generation means for generating an acoustic signal corresponding to the identification code.

4. An apparatus according to claim 1, wherein the call-incoming state includes at least one of communication, automatic answering, and communication rejection states.

5. An apparatus according to claim 1, wherein said time table corresponds to a schedule.

6. An apparatus according to claim 1, wherein said controlling means controls a call-incoming process in a call-incoming state which is different from the call-incoming state currently set corresponding to said identification code received by the receiving means, when a new incoming call is received while the communication is being performed.

7. An apparatus according to claim 6, wherein said controlling means notifies said new incoming call and informs a new incoming call sender that the apparatus is busy when the call-incoming state is set in communication.

8. A radio communication apparatus for performing communication via base stations connected to communication networks, comprising:

means for receiving incoming calls based on a plurality of identification codes from said base stations;

means for notifying an identification code corresponding to an incoming call received by said receiving means;

time table storing means for storing a time table;

means for storing call-incoming states corresponding to the plurality of identification codes on the basis of the time table stored in said time table storing means;

means for comparing the identification code received by said receiving means with the identification codes stored in said storing means; and means for controlling a call-incoming process in accordance with a call-incoming state corresponding to identification codes; coincidence of which is determined by said comparing means.

9. An apparatus according to claim 8, wherein the call-incoming state includes at least one of communication, automatic answering, and communication rejection states.

10. An apparatus according to claim 8, wherein said time table corresponds to a schedule.

11. An apparatus according to claim 8, wherein said controlling means controls a call-incoming process in a call-incoming state which is different from the call-incoming state corresponding to said identification code received by the receiving means, when a new incoming call is received while the communication is being performed.

12. An apparatus according to claim 11, wherein said controlling means notifies said new incoming call and informs a new incoming call sender that the apparatus is busy when the call-incoming state is set in communication.

* * * * *